April 2, 1957   B. C. PIERSTORFF   2,787,512
MEASURING APPARATUS
Filed Oct. 30, 1953   3 Sheets-Sheet 1

INVENTOR.
BUCKLEY C. PIERSTORFF
BY Arthur H. Swanson
ATTORNEY.

April 2, 1957 B. C. PIERSTORFF 2,787,512
MEASURING APPARATUS

Filed Oct. 30, 1953 3 Sheets-Sheet 2

INVENTOR.
BUCKLEY C. PIERSTORFF
BY Arthur H. Swanson
ATTORNEY.

April 2, 1957 B. C. PIERSTORFF 2,787,512
MEASURING APPARATUS
Filed Oct. 30, 1953 3 Sheets-Sheet 3

INVENTOR.
BUCKLEY C. PIERSTORFF
BY
ATTORNEY.

United States Patent Office 2,787,512
Patented Apr. 2, 1957

2,787,512

MEASURING APPARATUS

Buckley C. Pierstorff, Hatboro, Pa., assignor to Minneapolis-Honeywell Regulator Company, Minneapolis, Minn., a corporation of Delaware Application October 30, 1953, Serial No. 389,239

9 Claims. (Cl. 346—32)

A general object of the present invention is to provide a new and improved apparatus for indicating and recording operational characteristics of a process or device by observing the manner in which a predetermined signal passes through the device or process. More particularly, the present invention is concerned with providing an apparatus for determining an operational characteristic of a process or device wherein said apparatus is characterized by its accuracy, reliability, and high frequency of operation.

It is frequently desirable to know the operating characteristics of an industrial process or of a control device which may be used to control a process. One manner of determining the characteristics of the process or of the control device used in a process is to feed into the device or process a control signal having a known characteristic. By comparing the input signal with the output signal derived from the device or process, it is possible to determine the manner in which the output of the device or process responds to the input. The output signal when properly referenced to the input signal is useful in determining the phase shift and gain of the process or device under examination. By varying the frequency of the input control signal to the device or process it is possible to determine by observing the recorded data, optimum operating conditions for the device or process.

The dynamic response of the device or process to a predetermined input signal, which is obtained by comparing the input to the output, is sometimes referred to as the transfer function of the device or process. The term transfer function may also be defined as the mathematical expression of the dynamic characteristics of a device or process in terms of the ratio of the output of the device with respect to the input applied thereto.

In order for a measuring apparatus of the present type to be useful, it is essential that the apparatus be able to operate at very low frequencies as well as at relatively high frequencies while producing an accurate and permanent record of the response of the device or process. There is disclosed in a copending application of Robert J. Ehret, entitled Indicating and Recording Apparatus, Serial No. 310,019, filed September 17, 1952, an apparatus for making a permanent record of a transfer function of a device or process. The device of this prior application is operable over a wide range of frequencies. Heretofore it has been difficult to operate prior art devices of this type in the high froquency range of operation due to transient conditions which tend to cut down the sensitivity and response of the measuring and recording apparatus. The effect of these transient conditions must be eliminated in order for the apparatus to operate in the higher frequency range.

It is accordingly a more specific object of the present invention to provide a new and improved measuring apparatus for making a record of the electrical characteristics of a varying signal.

Another more specific object of the present invention is to provide a new and improved measuring apparatus for recording the characteristics of an electrical signal wherein said apparatus has a high speed of response to enable the apparatus to be used with high frequency signals.

Still another more specific object of the present invention is to provide a recording apparatus for a varying signal wherein the signal is periodically sampled by means of an electrical self balancing measuring circuit which is rendered effective during short intervals of the varying signal.

A further more specific object of the present invention is to provide a new and improved measuring apparatus for recording and indicating the electrical characteristics of a varying signal wherein said apparatus includes a pair of recording channels having an amplifier and motor combination in each channel with means for rendering said channels alternately effective to sample the varying signal while rendering the opposite channel ineffective during the sampling operation.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

Figure 1:
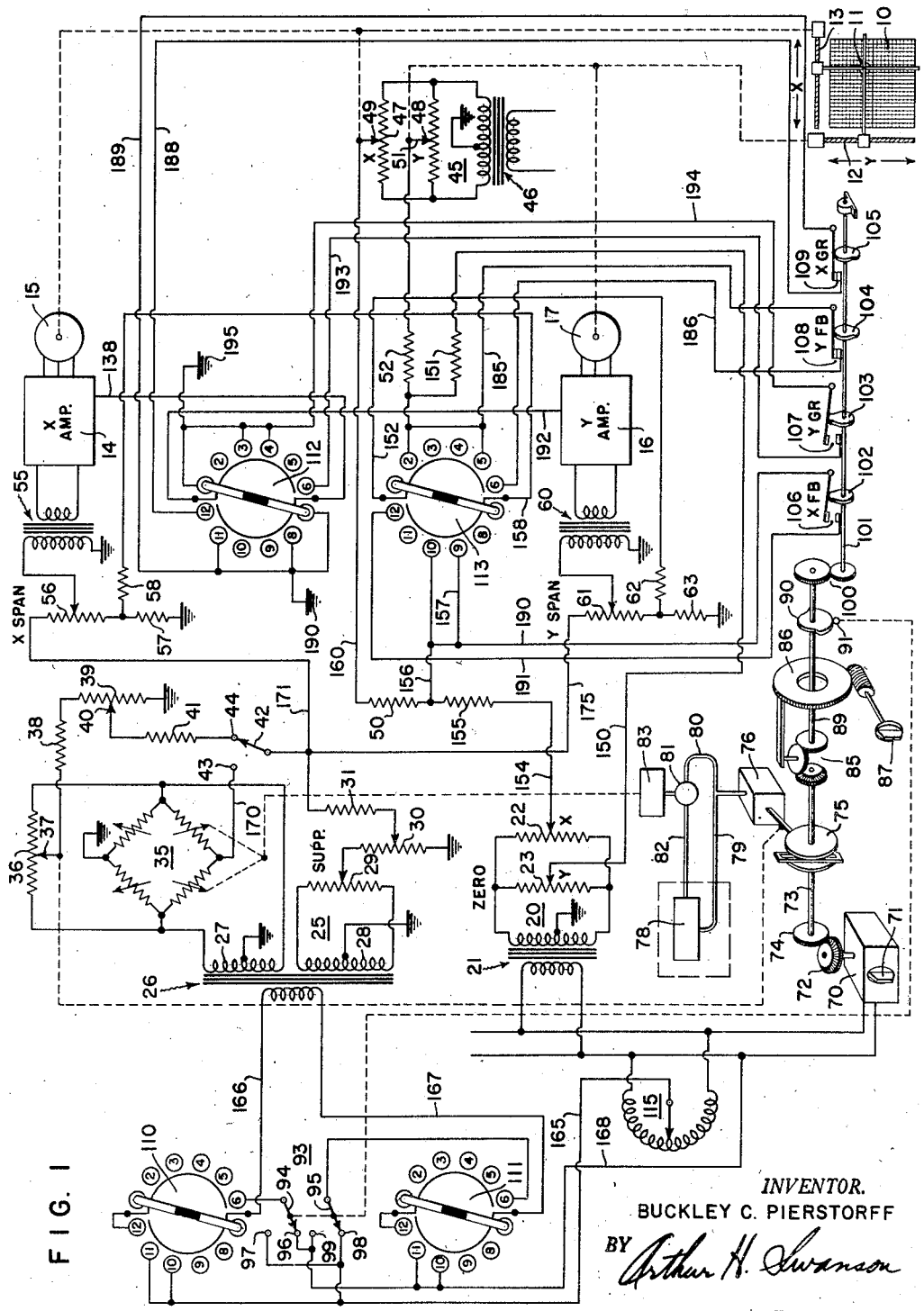
Fig. 1 is a schematic showing of the complete electrical circuit which incorporates the present invention.

Referring now to Fig. 1, the numeral 10 represents a recording chart having a Cartesian coordinates, although polar coordinates may be used. Cooperating with the chart 10 is a pen mechanism 11 which is arranged to be driven in two axes by suitable drive gears 12 and 13 which drive the pen 11 in the Y and X axis respectively. The driving signal for the gear 13 originates from an X axis amplifier 14 which is connected to reversibly drive a motor 15 connected to the output thereof. The amplifier 15 may take the form shown in Fig. 3 as will be explained below. The gear 12 is arranged to be driven by the Y axis amplifier 16 which is connected to reversibly drive a motor 17. This amplifier may likewise take the form of the amplifier shown in Fig. 3, to be more fully discussed below.

The input signals to the X amplifier 14 and the Y amplifier 16 are derived from a plurality of signal sources. One signal source is the zeroing source 20 which comprises a transformer 21 having a grounded center tap secondary winding which is connected at its end terminals to a pair of zeroing potentiometers 22 and 23. The potentiometer 22 is the zeroing potentiometer for the X axis amplifier while the potentiometer 23 is the zeroing potentiometer for the Y axis amplifier 16. Another signal source in the X and Y amplifiers is the suppression source 25. This source is supplied by a transformer 26 having a pair of secondary windings 27 and 28, both of which are center tapped. The winding 28 is connected to the end terminals of a suppression potentiometer 29. The suppression potentiometer has connected thereacross a further adjustable potentiometer 30. In series with the ouput slider of the potentiometer 30 is a suitable summing resistor 31.

Connected to the secondary winding 27 of the transformer 26 is a further signal source 35 which may take the form of the resistance bridge of a Statham gauge which converts a pressure signal into an electrical signal. Also connected across the end terminals of the secondary 27 is a further potentiometer 36, which may be used alternately with source 35. The latter potentiometer 36 has an adjustable slider 37 which is adapted to be reciprocated in a sinusoidal manner across the slidewire potentiometer in a manner to be described below.

Connected to the slider 37 is a voltage dropping resistor 38 and an adjustable potentiometer 39, the latter having a slider 40. Connected in series with the slider 40 is a suitable summing resistor 41. A switch blade 42 has a pair of contacts 43 and 44 cooperating therewith which provide means for selecting the electrical signal from either the slider 37 or the source 35.

A further signal source for the apparatus is the feedback rebalancing signal source 45. This source includes a transformer 46 with a center tapped secondary winding, the end terminals of which are connected to a pair of rebalancing potentiometers 47 and 48. The potentiometer 47 has a slider 49 which is connected to supply a rebalancing potential to the X amplifier 14 by way of a summing resistor 50. The rebalancing potentiometer 48 has a slider 51 which is connected to supply a rebalancing signal to the Y amplifier 16 by way of a summing resistor 52.

The input to the X amplifier 14 is by way of an input transformer 55 which has its primary connected to a span potentiometer 56. Connected to the lower end of the span potentiometer 56 are a pair of resistors 57 and 58.

The input to the Y amplifier 16 is by way of a transformer 60 having its primary winding connected to a span potentiometer 61. Connected to the lower end of the span potentiometer 61 are a pair of fixed resistors 62 and 63.

For producing a sinusoidal signal there is provided a variable speed drive mechanism 70 which has a manually adjustable knob 71 for variably selecting the speed of operation. The output of this mechanism is by way of an output gear 72 which is geared to a shaft 73 by a gear 74. The shaft 73 is adapted to drive the scotch yoke mechanism 75 with the output of the scotch yoke applied to a motion to pressure transducer 76 which will produce a sinusoidally varying pressure signal, as well as drive slider 37 if desired. This sinusoidally varying pressure signal is adapted to be applied to a device or process 78 which is under examination by way of a conduit 79. The output of the transducer 76 may also be applied by way of a conduit 80 to a selector switch 81. The selector switch 81 is adapted to select the pressure signal originating from either the transducer 76 directly or the output of the device or process 78 by way of a conduit 82. The pressure signal on the output of the switch 81 is applied to the housing 83 which contains the Statham gauge electrical elements associated with the signal source 35.

Also driven by the shaft 73 is a differential mechanism 85. This mechanism cooperates with a phase changing gear 86 which is adjustable by a manually adjustable knob 87. The phase changing gear is adapted to vary the angular position of the shaft 73 with respect to a further shaft 89 which is driven by way of the differential gearing 85. The shaft 89 will rotate at the same speed as the shaft 83 and this shaft carries a camming surface 90 which has a follower 91 cooperating therewith. The follower 91 is adapted to control the operation of a phase reversing switch 93 which comprises a pair of switch blades 94 and 95. The blade 94 is shown in engagement with a contact 96 and is adapted to be moved into engagement with a further contact 97 as the camming surface 90 is rotated. The blade 95 is shown in engagement with a contact 98 and is adapted to be moved into engagement with a contact 99 from a similar operation of the camming surface 90.

Connected to the end of the shaft 89 is a one to two stepup gearing 100. This gearing is effective to drive a further shaft 101 at twice the speed of rotation as the shaft 89. Carried by the shaft 101 are a plurality of switching cams 102, 103, 104, and 105. A switching cam 102 controls a switch 106 located in the X feedback circuit. The cam 103 controls a switch 107 which is associated with the Y amplifier 16. The switching cam 104 is associated with a switch 108 which is operative in the Y feedback circuit. The switching cam 105 controls a switch 109 which is associated with the X amplifier 14.

The apparatus also includes a plurality of switches 110, 111, 112, and 113 which are ganged together to be operated by a single knob, not shown. These switches are used in the electrical circuit for adjusting the apparatus prior to putting the apparatus into operation as will be explained below. Also included in the apparatus is an adjustable variac 115 which will vary the magnitudes of the voltages in transformer 26.

Figure 3:
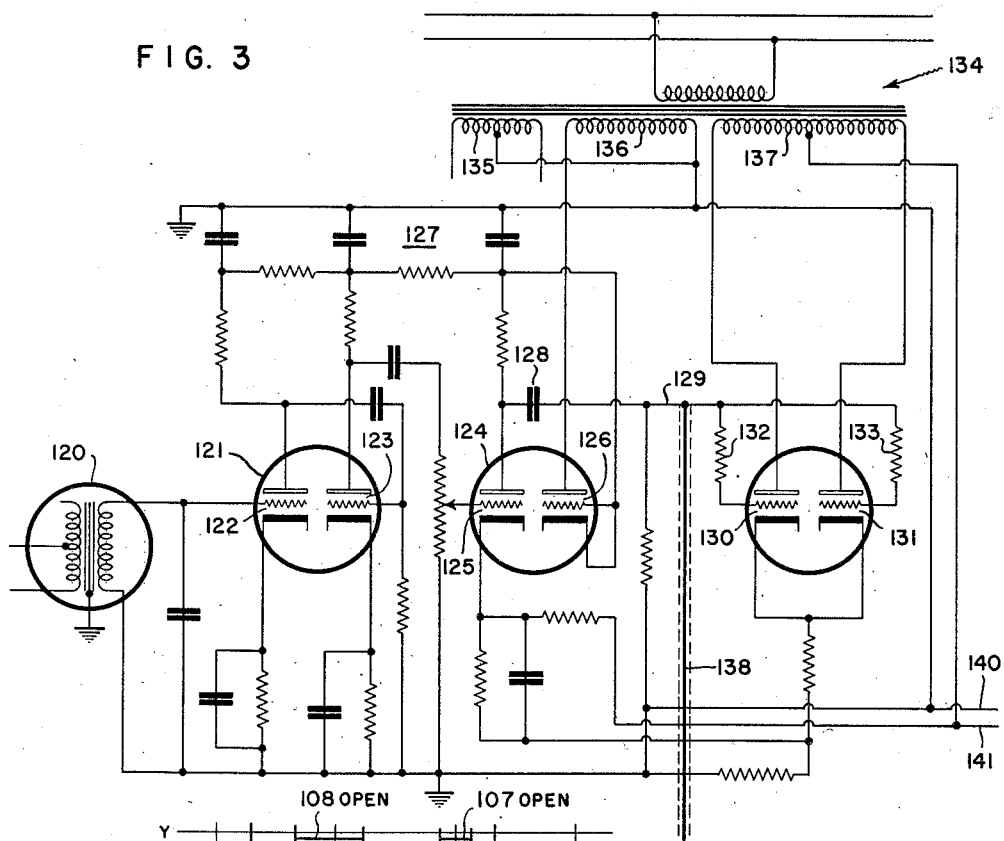
Fig. 3 shows a representative electrical amplifier which may be used in the apparatus.

The apparatus shown in Fig. 3 is a representative showing of an amplifier which may be used to reversibly drive either of the motors 15 or 17. This amplifier includes an input transformer 120 having a primary winding and a secondary winding, the latter of which is connected to the input of an amplifier tube 121. The tube 121 includes a pair of amplifier sections 122 and 123 with the output of the section 122 being applied to the input of the section 123. A further amplifying tube 124 includes an amplifier section 125 and a triode section 126 which is connected as a diode. The amplifier section 125 receives the output signal from the section 123. The triode section 126 which is connected as a diode serves as a rectifier for producing the direct current supplied to the amplifier sections 122, 123, and 125. A conventional resistor-condenser filter 127 is used to filter the direct current produced by the section 126.

The output of the amplifier section 125 is applied to a motor drive section by way of a condenser 128 and a lead 129. The motor drive section includes a pair of phase discriminating amplifier sections 130 and 131 with the lead 129 connected to the input of the section 130 by way of a grid resistor 132 and connected to the input of the amplifier section 131 by way of a grid resistor 133.

Power is supplied to the phase discriminator section by a transformer 134 which has secondary windings 135, 136, and 137. The secondary 137 has its end terminals connected to the anodes of the amplifier sections 130 and 131. The secondary 136 has its end terminals connected to supply the energizing signal to the rectifier section 126. Winding 135 is the source of power for the heaters of the tubes of the amplifier.

The input lead 129 of the phase discriminator section has a shielded cable 138 connected thereto and this shielded connection is provided for grounding the inputs of the amplifier sections 130 and 131 by the cam operated switches 107 or 109 depending upon whether the amplifier is used with the Y or X sections. The output from this phase discriminator section is by way of leads 140 and 141.

*Standby position*

The apparatus as shown in Fig. 1 of the drawings is in the standby position. In this position, the ganged switches 110, 111, 112, and 113 have their respective shorting bars engaging contacts 1 and 7. When in this position, the apparatus is inoperative and there will be no operation of either of the motors 15 or 17. The motor drive section of X axis amplifier 14 will have the grid lead thereof grounded by a circuit that may be traced from the X amplifier 14, through lead 138, shorting bar of switch 112, contact 7, to ground 190. The Y amplifier 16 has its motor drive section grounded by a circuit that may be traced through lead 192, shorting bar of switch 112, contact 1 to ground 195.

*Y axis zeroing adjustment*

In order to zero the pen 11 on the chart 10 insofar as the Y axis is concerned, the ganged switches 110 through 113 are switched into their next position which is the position where the shorting bars are contacting contacts 2 and 8 in each of the switches. When in this position the energizing circuit to the transformer 26 will be open and there will be no signals originating from the signal source connected to the secondaries of this transformer. However, there will be an electrical signal applied to the input of the Y amplifier 16. One signal will originate from the Y axis zeroing potentiometer 23 by way of a circuit that may be traced from the slider of the potentiometer 23 through lead 150, summing resistor 151, contact 2 of switch 113, shorting bar of switch 113, lead 152, resistor 62, span potentiometer 61, to the input of transformer 60 of the Y amplifier 16. Also applied to the input of the Y amplifier 16 will be the feedback signal from the rebalancing potentiometer. This signal may be traced from the slider 51 to resistor 52 to contact 2 of switch 113, through the shorting bar of the switch 113 to lead 152, and then through resistor 62 and the Y span potentiometer 61 to the input transformer 60 of the Y amplifier 16. When in this position, the Y zeroing potentiometer 23 will be adjusted so that the Y motor 17 will position the pen 11 so as to be centered on the chart 10. As soon as the pen is vertically centered on the chart 10, the apparatus may then be moved to the next alignment position.

X axis zeroing adjustment

In order to center the pen 11 on the horizontal center line of the chart 10, the ganged switches 110 through 113 are switched to the third position where the respective shorting arms are engaging contacts 3 and 9 in each of the respective switches. When in this position, the X amplifier 14 will have an input signal which is derived from the X axis zeroing potentiometer 22 and the X axis rebalancing potentiometer 47. The signal from the X axis zeroing potentiometer may be traced from the slider potentiometer through lead 154, summing resistor 155, lead 156, lead 157, contact 9 of switch 113, the shorting switch arm of switch 113, lead 158, resistor 58, and the X span potentiometer 56 to the input transformer 55 on the input of the X amplifier 14. The rebalancing signal for the X axis may be traced from the slider 49 of the rebalancing potentiometer 47 through lead 160, resistor 50, lead 156, lead 157, contact 9, shorting arm of switch 113, lead 158, resistor 58, and X span potentiometer 56 to the input transformer 55. The zeroing is accomplished by moving the slider of the zeroing potentiometer 22 until such time as the pen 11 has been centered on the X axis of the chart 10.

X axis span and suppression adjustment

The purpose of the span and suppression adjustments is to select the particular maximum range of movement desired of the pen 11 as it moves on the chart 10. In other words, it is desired to set the maximum limit to which the pen will move from the zero position when the pen is adjusted in the X axis and to center the maximum limits about the zero position.

The X axis span and suppression adjustment is accomplished by advancing the ganged switches 110 through 113 to their next position which is where the shorting bars of each of these switches engages contacts 4 and 10. When the apparatus is so switched, the transformer 26 will be energized by a circuit that may be traced from the adjustable voltage device 115 through lead 165, contact 10 of switch 110, the shorting switch arm thereof, lead 166, primary of transformer 26, lead 167, to the shorting arm of switch 111, contact 10 thereof, and lead 168 back to the other terminal of the adjustable voltage device 115. When power is supplied to the transformer 26 through the last traced circuit, both the secondaries 27 and 28 will have a voltage signal thereon. This will mean that the suppression potentiometer 29 will have a voltage thereacross, and there will be a voltage for the signal source 35 as well as the potentiometer 36.

At the same time that the transformer 26 is energized, the variable speed drive 70 is brought into operation so that the shaft 73 will be rotating. With the shaft 73 rotating, the transducer 76 will be producing a pneumatic signal which will be varying sinusoidally with the mechanical output of the scotch yoke 75. This sinusoidal signal may be applied either directly to the housing 83 containing the Statham gauge bridge 35 by way of conduit 80 or it may be applied to the housing 83 through the process or device 78 by way of conduits 79 and 82. In either event, the speed of operation of the variable speed drive 70 is selected so that there will be no appreciable loss of amplitude or shift in phase of the applied signal. Assuming that the signal is applied directly from the transducer 76 to the housing 83, the Statham gauge bridge of the signal source 35 will be cyclically varied in accordance with the sinusoidal pressure signal applied thereto. This sinusoidal signal will produce a sine wave which is of a frequency corresponding to the speed of operation of the variable speed drive 70. By switching the switch blade 42 so that it engages contact 43, the signal in the output of the signal source 35 will be applied to the input of the X amplifier in a circuit that may be traced from the output lead 170, contact 43, switch blade 42, lead 171, and X span potentiometer 56 to the input transformer 55 of the X amplifier 14. During this operation, the suppression potentiometer 29 will have a signal thereon and this will be applied to the X amplifier input by a circuit that may be traced from the slider of the potentiometer 29 through potentiometer 30, resistor 31, lead 171, and X span potentiometer 56 to the input transformer 55. The X axis zero potentiometer 22 will also be applying a signal to the input of the X amplifier and this signal may be traced from the X axis zeroing potentiometer slider through lead 154, resistor 155, lead 156, contact 10 of switch 113, shorting arm of switch 113, lead 158, resistor 58, and X span potentiometer 56 to the input transformer 55. Also connected to the input of the X axis amplifier 14 will be the X axis feedback potentiometer 47 and the circuit for this may be traced from the slider 49 through 160, resistor 50, lead 156, shorting arm of the switch 113, lead 158, resistor 58, and X span potentiometer 56, to the input of transformer 55.

With these signals being applied to the input of the X axis amplifier, the amplifier will respond to the signal variations produced by the signal source 35 as it is sinusoidally varied by the transducer 76. During this particular operation, the reversing switch 93 is rendered ineffective by the switches 110 and 111 maintaining a circuit to transformer 26 independent of the switch 93. With the sinusoidal variations from the signal source 35 appearing on the input of the X amplifier 14, said variations occurring at a frequency of four or five cycles per minute, for example, the X amplifier will drive its motor 15 in such a manner as to cause the balancing slider 49 of the X axis balancing potentiometer 47 to follow and produce a corresponding balancing action. This balancing motion will appear upon the chart 10 by the pen 11 being moved back and forth across the chart. The X span potentiometer 56 is adjusted so that the length of swing of the pen 11 back and forth across the chart 10 is that which is desired for maximum pen position. The suppression potentiometer 29 is adjusted so that the swing of the pen 11 on either side of the zero point of the chart 10 will be the same.

Y axis span and suppression adjustment

When the apparatus is to be adjusted in span and suppression in the Y axis, the ganged switches 110 through 113 are switched to the next position wherein the respective shorting bars of the switches are engaging contacts 5 and 11. When so switched, the transformer 26 will be energized in a circuit which corresponds to the circuit traced for the X axis span and suppression adjustment position except that it will be through the contacts 11 of the switches 110 and 111. As with the adjustment in the X axis, the variable speed drive unit 70 will be operating.

Included in the signal sources applying signals to the Y axis amplifier 16 will be the signal source 35 whose signal will be cyclically varied in accordance with the sinusoidal pressure variations applied to the housing 83 by way of transducer 76. The input circuit may be traced from the output lead 170 connected to the source 35 through contact 43, switch blade 42, lead 175, Y span potentiometer 61 and input transformer 60 on the input to the Y axis amplifier 16. Also connected to the Y axis amplifier will be the suppression signal source 25 and this connection may be traced from the suppression potentiometer 29, through potentiometer 30, resistor 31, lead 175, and Y span potentiometer 61 to the input transformer 60. The Y axis zero potentiometer is likewise connected to the input of the Y axis potentiometer 23 through lead 150, resistor 151, contact 5 of switch 113, the shorting switch arm to lead 152, resistor 62, and the Y span potentiometer 61 to the input transformer 60 on the Y axis amplifier 16. The Y axis rebalancing potentiometer 48 is likewise connected to the input of the Y axis amplifier 16 and this circuit may be traced from the slider 51 through resistor 52, contact 5 of switch 113, shorting arm of the switch 113, lead 152, resistor 62, and the Y span potentiometer 61 to the input transformer 60.

As in the operation of the X axis span and suppression alignment, the Y axis span and suppression alignment is provided for setting the maximum pen travel of the pen 11 over the chart 10 on either side of the center of the chart in a vertical direction. Thus, the sinusoidal signal produced by the source 35 will be effective to cause the motor 17 to drive the slider 51 in a following or rebalancing manner and to position the pen 11 vertically on the chart 10 by way of the drive gear 12. The Y span potentiometer 61 will be adjusted to set the maximum point of travel of the pen 11 in its vertical movement and this point of maximum travel will preferably be the same as selected for the X axis. While generally the suppression potentiometer 29 need not be adjusted for centering the Y axis pen movement, due to its having been adjusted on the X axis, such adjustment may be necessary under certain circumstances. If it is necessary, it is necessary to go back and do the preceding step of adjusting the X axis span and suppression adjustment and again check the Y axis span and suppression.

*Transfer function plotting operation*

The foregoing explanation has merely outlined the manner in which the apparatus is brought into operation. In order for accurate results to be obtained it is essential that the foregoing adjustment be made of the apparatus to insure that the final record is indicative of the actual transfer function characteristics of the device or process under test. When the foregoing adjustment or alignment is completed, the apparatus may then be switched to its next position which is sometimes referred to as the Nyquist position. In this position, the ganged switches 110 through 113 have their respective shorting bars engaging contacts 6 and 12. When in this position, the variable speed drive 70 will be operating and the reversing switch 93 will be operative. With the variable speed drive 70 operating, the transducer 76 will be producing a sinusoidally varying pressure signal in the output thereof. This signal will be applied either to the process 78 or directly to the transducer housing 83 which contains the bridge circuit 35. It is assumed initially that the pressure signal is applied directly to the transducer housing 83 which will cause the bridge circuit 35 to have an electrical output which is sinusoidally varied in a manner which is following the pressure signal generated by the transducer 76. This sinusoidal signal is represented by the curve 181 shown in Fig. 5. It is assumed further that this curve is phased with respect to the indicated axis so that it has zero amplitude as it passes through 0° and 180°.

In addition to producing the sinusoidally varying signal in the source 35, the variable speed drive is also driving the shaft 101 so that the switching cams 102 through 105 are operated twice during each cycle. The phasing adjustment knob 87 is preferably adjusted so that the switching operation will be effectively centered on the 0°, 90°, 180° and 270° positions of the sinusoidally varying signal. As the switching cams operate, the switches 106 and 107 will operate at the 0° position and the switches 108 and 109 will be open at the 90° and 270° positions.

By the operation of these switches, it is desired to sample the amplitude of the signal 181 every 90°. In other words, the apparatus is arranged so that the X amplifier 14 will first look at the amplitude of the signal and then 90° later, the Y amplifier will look at the signal. When the respective amplifiers are looking at the signal, their motors will be driven to adjust the respective balancing sliders and pen drive gears until a balance position is reached.

Figure 4:
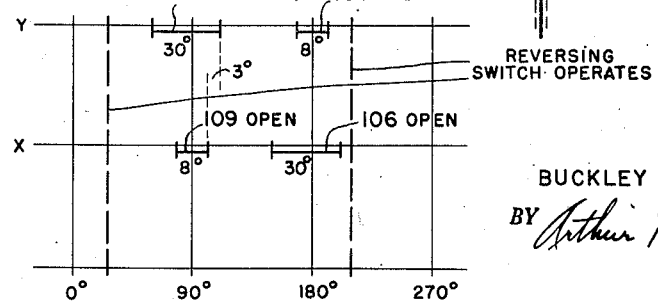
Fig. 4 is a diagram showing the relative switching periods for the switches of the apparatus.

As shown in Fig. 4, the X sampling has been selected to take place at the 90° position as indicated by the switch 109 being open. The Y sampling has been selected to take place at the 180° position as indicated by the switch 107 being open.

As the apparatus is shown in Fig. 1, the switches 106 and 107 are open and this is the switch action that takes place at the 0° and 180° positions of the wave 181. When the switch 107 is open, the Y amplifier 16 will have an input signal which is derived from the zeroing signal source 20, the suppression signal source 25, the variable signal source 35, and the feedback signal source 45. The zeroing signal source connection may be traced to the input of the Y amplifier by a circuit that may be traced from the Y axis zero potentiometer 23 by way of lead 150, resistor 151, lead 185, switch 108, lead 186, contact 6 of switch 113, the shorting bar of switch 113, lead 152, resistor 62, and the Y span potentiometer 61 to the input transformer 60. The suppression signal source 25 may be traced to the input of the Y axis amplifier 16 by a circuit that may be traced from the suppression potentiometer 29 through potentiometer 30, resistor 31, lead 175, and Y span potentiometer 61 to the input transformer 60. The variable signal source 35 is connected to the input of the Y amplifier by way of lead 170, contact 43 of switch 42, lead 175, and the Y span potentiometer 61 to the input transformer 60. The Y axis feedback signal is applied to the input of the Y axis amplifier by a circuit that may be traced from the slider 51 through resistor 52, lead 185, switch 108, lead 186, contact 6 of switch 113, the shorting bar of the switch 113, lead 152, resistor 62, and the Y span potentiometer 61 to the input transformer 60.

When these last traced circuits are completed, the Y axis amplifier 16 will drive the motor 17 to a position so that there will be an electrical balance on the input of the amplifier due to the repositioning of the slider 51 of the rebalancing potentiometer 48. With the assumed signal shown in Fig. 5 and the switching operation taking place at either the 0° or 180° position, the pen 11 should be centered in a vertical direction on the chart 10.

During the interval when the Y amplifier is sampling, the X axis amplifier 14 is rendered inoperative. The X axis amplifier 14 is rendered inoperative by the grounding of the motor drive section of the amplifier which grounding is accomplishing by the grounding of the lead 138 shown in the amplifier of Fig. 3. This grounded circuit may be traced from the lead 138, shown in Fig. 1, through the shorting arm of the switch 112, contact 12 of switch 112, lead 188, switch 109, lead 189, back to ground at 190. With this circuit completed, the X amplifier will be ineffective to drive the motor 15 and the pen 11 will be maintained stationary in the X axis.

During the same sampling interval when the Y axis amplifier is operative, the X axis feedback signal is removed from the electrical circuit by the operation of the switch 106. This circuit is opened so as to prevent any interaction between the X axis feedback signal and the input signals to the Y axis amplifier. This open circuit in the feedback circuit may be traced from the slider 49 through lead 160, resistor 50, lead 156, lead 190, to the open switch 106.

Ninety degrees later in the operation of the apparatus, the switches 106 and 107 will be in a closed position and switches 108 and 109 will be open. When the switches are in this position, the Y amplifier will be rendered inoperative and the X amplifier will be connected to sample the electrical signal originating from the source 35. The other signal sources applying signals to the X amplifier are the zeroing signal source 20, the suppression signal source 25, and the rebalancing signal source 45.

The variable source 35 is connected to the input of the X axis amplifier 14 by way of lead 170, contact 43, switch blade 42, lead 171, and the X span potentiometer 56 to the input transformer 55. The suppression signal source is connected to the X axis amplifier by a circuit that may be traced from the suppression potentiometer 29, potentiometer 30, resistor 31, lead 171, and the X span potentiometer 56 to the input transformer 55. The zeroing signal for the X amplifier may be traced from the X axis zeroing potentiometer 22 through lead 154, resistor 155, lead 156, lead 190, closed switch 106, lead 191, contact 12 of switch 113, the shorting arm of the switch 113, lead 158, resistor 58, and the X span potentiometer 56 to the input transformer 55. The feedback signal for the X axis amplifier 14 may be traced from the slider 49 through lead 160, resistor 50, lead 156, lead 190, closed switch 106, lead 191, contact 12 of switch 113, the shortening arm of switch 113, lead 158, resistor 58, span potentiometer 56 to the input transformer 55.

The Y axis amplifier will be rendered inoperative by the grounding of the corresponding motor drive circuit input by a circuit that may be traced from lead 192 through the shorting arm of switch 112, contact 6 of switch 112, lead 193, closed switch 107, lead 194 to the ground at 195.

Figure 5:
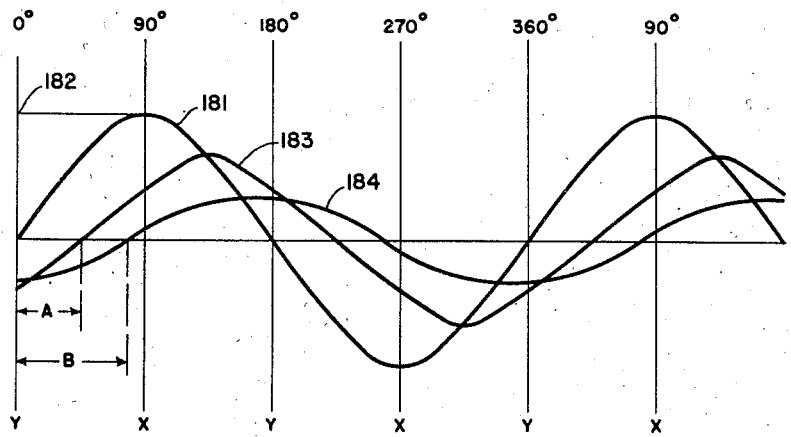
Fig. 5 shows representative wave forms used in the apparatus.
Figure 6:
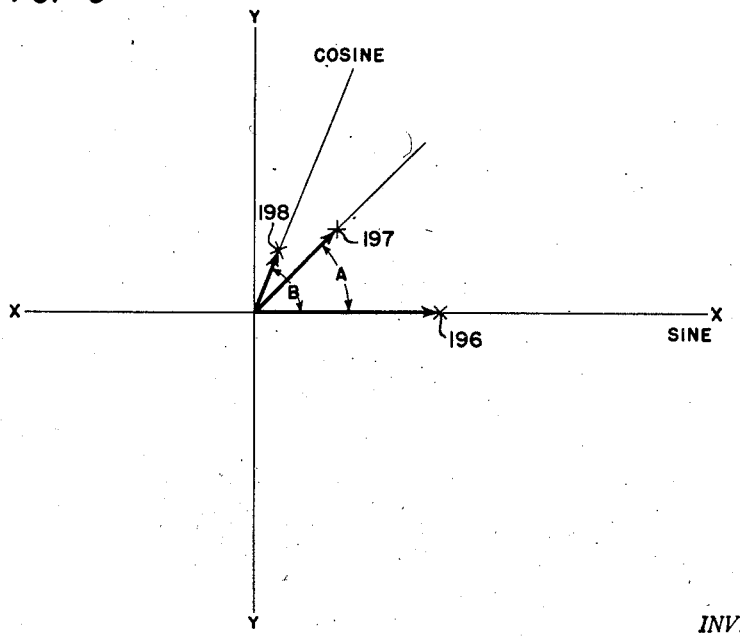
Fig. 6 shows a representative plot of points recorded by the recording chart of the apparatus.

While the X axis amplifier is operative in sampling the wave 181, the amplifier will see the amplitude of the signal 181 as represented by the numeral 182 on the zero axis in Fig. 5. This will cause the X axis motor to drive the rebalancing slider 49 and the pen 11 to an appropriate rebalance position which will be indicated by the positioning of the pen 11 to the right of center on the chart 10. Referring to Fig. 6, this may be represented by the point 196 on the chart.

During the X axis sampling, the Y axis feedback circuit is rendered inoperative by the open circuiting of this circuit. The circuit showing this opening may be traced from the slider 51 through resistor 52, lead 185, to the switch 108 which is in the open position during the X axis sampling.

The apparatus will continue to operate in the above manner with an X axis sampling and a Y axis sampling taking place every 90° of the basic signal generated by the transducer 76. As the bridge circuit of the variable signal source 35 is electrically centered and is energized by alternating, such as 60 cycles, the phasing of the output of the bridge on lead 170 will reverse every half cycle of the signal produced by the transducer 76. In the absence of other circuitry, the pen 11 would tend to be driven to a position on one side of the zero point of the chart 10 on the first measurement during the cycle and to the opposite position during the next sampling operation of the same axis in the same cycle. To prevent this from occurring, the reversing switch 93 is provided. This switch reverses the phasing of the alternating current applied to the transformer 26 every half cycle with the switch 93 being actuated by the cam 90 and the follower 91.

Figure 2:
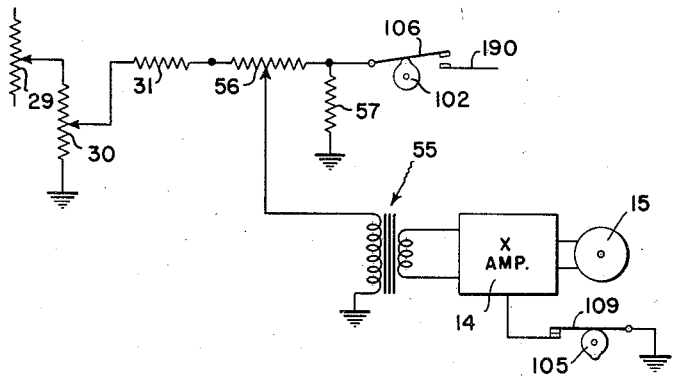
Fig. 2 shows in detail the switching operation of the present invention by which the sampling is effective.

For a better understanding of the switching of the individual sampling circuits, reference may be had to Fig. 2 which shows the principal switching condition in the X axis. The reference numerals in Fig. 2 correspond to those of Fig. 1. Here it is shown that the lead 190 which carries the feedback signal is switched by the switching cam 102 operating on switch 106 with the switch 106 being opened at the same time that the switch 109 is closed. The switch 109 effectively grounds or short circuits the input to the motor drive section of the amplifier, as it is shown in detail in Fig. 3. When in the position shown, the Y axis sampling will take place. When the switch 106 is closed and switch 109 is open, the X axis sampling will take place.

In order to check the process or device 78 with respect to the reference point already produced on the chart 10, as explained above, the switch 81 will be positioned so that the pressure signal from the transducer 76 will be applied through the device or process 78 to the transducer housing 83. Due to the characteristics of the device or process, it will be assumed that there is a loss of amplitude and a shifting of the phase of the output signal with respect to the input signal. This output from the device 78 may be represented by the curve 183 shown in Fig. 5. The sampling operation explained above will continue to take place at every 90° interval and the apparatus will sense the amplitude of the wave 183 of each 90° interval. This may be indicated by the point 197 shown in Fig. 6. The angular phase shift of the signal passing through the device or process 78 will be indicated by the angle between the vector for the point 196 and the vector for the point 197. The length of the vector for point 197 will be indicative of the amplitude which may be referenced in terms of gain.

If the frequency of the signal produced by the transducer 76 is changed by the changing of the speed of the variable speed drive 70, there will generally be a resultant change in the transfer characteristics of the device or process 78. Thus, it is assumed that the variable speed drive 70 is increased in speed so that there will be a higher frequency signal applied to the device or process 78. The output curve in this instance may be assumed to be curve 184 shown in Fig. 5. In this latter instance, the sampling operation in both the X and Y axis will take place as explained above and a representative point such as point 198 may be produced in the chart as shown in Fig. 6. In this particular instance, the amplitude will be shown to have decreased by the shortening of the vector between the zero point and the point 198. The phase displacement will be indicated by the phase angle B and the length of the vector to the point 198 will be indicative of the amplitude of the wave 184 which may likewise be referenced in terms of gain.

The points in Fig. 6 may be joined with a plurality of other points obtained in a manner similar to that just explained above and an appropriate plot, sometimes referred to as a Nyquist plot, may be obtained to determine the optimum operating characteristics of the device or process under test. In some instances, the transducer 76 will have an internal transfer function variation which must be taken into account. In these instances, a plot of points may be made of the characteristic of the transducer 76 by applying the signal from the transducer directly to the housing 83. The resultant plot may result in a series of points similar to those shown in Fig. 6. This plot would then be compared with a plot of the signals of the output of the device 78. The plot of the transducer characteristics would be obtained in the same manner as the original plot. By appropriate comparison of the curves, the actual transfer function of the device or process may be determined.

In the higher frequency ranges of operation of the present invention, particular care must be taken to insure that the amplifiers 14 and 16 are sensitive to the input signals applied thereto. In the prior devices of this type, the input to the X and Y amplifiers has been short circuited or grounded until the sampling operation is to take place. With removal of the ground or short circuit from the input of the amplifiers, there is a resultant transient or pulse produced which tended to swamp the amplifier. With low frequency operation, this is not objectionable in that the amplifier has an adequate opportunity to recover from the pulse. Thus, there is adequate time after the amplifier has recovered from the normal sampling operation to take place. However, when the higher frequencies are used, the amplifier is not able to recover and there is an accompanying loss of sensitivity in the apparatus so that its usefulness with high frequencies is impaired.

In the present apparatus, the particular sampling circuit has all of its input signal sources connected thereto for a sufficient interval prior to the sampling operation that any pulses or transients due to the operation of the isolating switches will be ineffective to destroy the sensitivity of the apparatus. Thus, the particular sampling circuit is conditioned for maximum sensitivity of the signals at the instant that the input of the motor drive section of the amplifier is rendered operative.

Thus, referring to Fig. 4, the switching operation about the 90° position is arranged so that the Y axis feedback circuit will be opened prior to the time of the sampling in the X axis indicated by the opening of the switch 109. After the switch 109 has closed, the switch 108 will close and while this will introduce a transient or pulse into the Y axis amplifier 16, this will not be objectionable because the Y axis amplifier will not sample until the switch 107 opens. As the switch 107 will not open until a considerable period after closing the switch 108, the Y axis amplifier will be able to dissipate the effects of the pulse or transient.

The switch timing may be arranged as shown in greater detail in Fig. 4. By way of illustration, switch 108 is open for 30° while switch 109 is open 8°. Further, the switch 108 opens 19° prior to the opening of switch 109 and remains open until 3° after switch 109 has closed.

The operation of the X axis is the same as that in the Y axis with the X axis feedback circuit being opened by the switch 106 during the interval when the Y axis is sampling. By opening the X axis feedback at a time interval prior to the Y sampling operation, any transients due to the opening in the X axis feedback will be eliminated. Further, the X axis feedback circuit will be closed at a time sufficiently prior to the next X axis sampling operation to prevent any resultant transients from affecting the sensitivity of the amplifier.

It will be noted from the above discussion that the input to the motor drive section of the X and Y axis amplifiers has the short circuit thereof periodically removed. This does not have any appreciable effect on lowering the sensitivity of the output of the motor drive section even though there may be a momentary transient due to the switching action. This is due primarily to the lack of any circuit components which will be sensitive to any switching transient taking place at the input of the motor drive section. While the switching operation can take place at the output of the motor drive section, the switching at the input is preferred due to the low current level present on the input. This tends to enhance the life of the switching contacts while providing effective means for rendering the output of the amplifier ineffective to control its respective motor.

While a particular switching method has been adapted in connection with the opening and closing of the contacts of the respective sampling circuits, it will be readily apparent that suitable pilot and control relays may be used to accomplish the same result. For high speed of operation, the sequence and timing of these switches should be carried out in the manner hereinabove set forth to effect optimum response at high speeds of operation.

As with the apparatus shown in the above mentioned Ehret application, the present apparatus may operate to test electrical apparatus. When so operative, the slider 37 may be connected into the testing circuit to establish the characteristic of the variable speed drive and scotch yoke mechanism 75. This signal may in turn be referenced to another input signal which is representative of the output signal from an electrical device under test. The operating principle in this arrangement will be the same as explained above.

While, in accordance with the provisions of the statutes, there has been illustrated and described preferred embodiments of the invention, those skilled in the art will understand that changes may be made in the form of the apparatus disclosed without departing from the spirit of the invention as set forth in the appended claims, and that some features of the present invention may be used to advantage without a corresponding use of other features.

Having now described my invention, what I claim as new and desire to secure by Letters Patent is:

1. In apparatus for periodically sampling a portion of a signal and indicating on an indicator the character of the signal, the combination comprising, an amplifier having an input section and an output section, a motor connected to the output of said amplifier and arranged to drive said indicator, a signal source, a rebalancing feedback signal source adjusted by said motor, a permanent connection between the input of said amplifier and signal source, a switch arranged to connect said feedback signal source to said input of said amplifier, and cyclically operating switch actuating means operative to close said switch for predetermined intervals during which it is desired for said motor to adjust said feedback signal source to a magnitude corresponding to that of said signal source.

2. In apparatus for periodically sampling a portion of a signal and indicating on an indicator the character of the signal, the combination comprising, an amplifier having an input section and an output section, a motor connected to the output of said amplifier and arranged to drive said indicator, a signal source, a rebalancing feedback signal source adjusted by said motor, a permanent connection between the input of said amplifier and signal source, a first switch arranged to render said output ineffective by grounding the input signal thereto, a second switch arranged to connect said feedback signal source to said input of said amplifier, and cyclically operating switch actuating means operative to close said second switch and to open said first switch for predetermined intervals during which it is desired for said motor to adjust said feedback signal source to balance said signal source.

3. Apparatus for rendering an amplifier effective to drive a balancing motor used in a high frequency wave sampling circuit where said motor adjusts a wave amplitude balancing source comprising, cyclically operated switch means actuated during a predetermined interval of each cycle in said high frequency wave, means including said switch means rendering the output of said amplifier ineffective to drive said motor except during said interval, and further means including said switch means for disconnecting the balancing signal source from the input of said amplifier.

4. Electrical apparatus comprising, first and second amplifiers, each of said amplifiers having an input section and a motor drive section, a motor connected to the motor drive section of each of said amplifiers, a common signal source connected to both of said amplifiers, a separate balancing signal source for each of said amplifiers, said signal sources being adjusted by said motors, cyclically actuated switch means for rendering said amplifiers alternately effective to drive their respective motors, said switch means rendering the balancing signal source ineffective and the motor drive section ineffective in one of said amplifiers when the other in effective to adjust its associated motor and balancing source to balance the input signal.

5. In an analyzer, the combination comprising, a signal generator for producing a signal to be applied to a process, a variable speed motor for driving said generator, a process output signal producing device, apparatus for indicating functions of said output signal producing device, first and second motors for driving said indicating apparatus in accordance with a first and second function to be indicated by said indicating apparatus, an amplifier for each of said motors connected to drive the same, each of said amplifiers having an input section and a motor drive section, means connecting said input sections to said output signal producing device, a balancing signal source for each of said amplifier input sections adjusted by the respective motor, switching means actuated by said variable speed motor, said switching means alternately connecting the respective balancing signal sources to the respective amplifiers, and further means including said switching means connecting the motor drive section of each of said amplifiers to be ineffective when the other of said amplifiers has its balancing signal source connected thereto.

6. In an analyzer, the combination comprising, a signal generator for producing a cyclically varying signal to be applied to a process, a variable speed motor for driving said generator, a process output signal producing device having a cyclically varying output signal, apparatus for indicating functions of said output signal producing device, a pair of motors for driving said indicating apparatus in accordance with first and second functions of said output signal, an amplifier for each of said motors connected to drive the same, each of said amplifiers having an input section and a motor drive section, means connecting said input sections to said output signal producing device, a balancing signal source for each of said amplifier input sections adjusted by the respective motor when operative to produce a signal to balance said output signal, switching means actuated by said variable speed motor, said switching means alternately connecting the respective balancing signal sources to the respective amplifiers, and further means including said switching means for alternately rendering ineffective the motor drive section of said amplifiers.

7. Apparatus as defined in claim 6 wherein said further means short circuits the inputs to said motor drive section to render said sections ineffective.

8. In an analyzer, the combination comprising, a signal generator for producing a cyclically varying signal to be applied to a process, a variable speed motor for driving said generator, a process output signal producing device having a cyclically varying output signal, apparatus for indicating functions of said output signal producing device, a pair of motors for driving said indicating apparatus in accordance with separate functions of said output signal, an amplifier for each of said motors connected to drive the same, each of said amplifiers having an input section and a motor drive section, means connecting said input sections to said output signal producing device, a balancing signal source for each of said amplifier input sections adjusted by the respective motor to balance, when effective, said output signal, switching means actuated by said variable speed motor, said switching means alternately connecting the respective balancing signal sources to the respective amplifiers, further means including said switching means alternately connecting each of said motor drive sections to be inoperative during the period when the other of said amplifiers has its balancing signal source connected thereto, said switching means connecting said motor drive sections to be operative from a time after the disconnection of the other of said amplifiers from its balancing source until prior to when said balancing source is reconnected.

9. An analyzing apparatus comprising, a signal source, self balancing electrical means connected to said source to follow the signal of said signal source, said electrical means having a feedback circuit for supplying a signal to balance the signal of said signal source, and means for cyclically opening and closing said feedback circuit so that said electrical means will be cyclically operative to produce a signal to balance the signal of said signal source.

References Cited in the file of this patent
UNITED STATES PATENTS

| | | |
|---|---|---|
| 2,464,708 | Mosely | Mar. 15, 1949 |
| 2,621,315 | Cuckler | Dec. 9, 1952 |